United States Patent [19]

Urkowitz et al.

[11] Patent Number: 5,309,161
[45] Date of Patent: May 3, 1994

[54] RADAR WITH DOPPLER TOLERANT RANGE SIDELOBE SUPPRESSION AND TIME DOMAIN SIGNAL PROCESSING

[75] Inventors: Harry Urkowitz, Philadelphia, Pa.; John J. Gallagher, Turnersville; Jerald D. Nespor, Mt. Laurel, both of N.J.; Sheldon L. Katz, Southampton, Pa.

[73] Assignee: General Electric Co., Moorestown, N.J.

[21] Appl. No.: 988,706

[22] Filed: Dec. 10, 1992

[51] Int. Cl.⁵ .............................................. G01S 13/28
[52] U.S. Cl. ................................... 342/132; 342/111; 342/192; 342/196
[58] Field of Search ............... 342/109, 111, 132, 192, 342/196

[56] References Cited

U.S. PATENT DOCUMENTS

| | | | |
|---|---|---|---|
| 5,103,233 | 4/1992 | Gallagher et al. | 342/408 |
| 5,151,702 | 9/1992 | Urkowitz | 342/134 |
| 5,157,403 | 10/1992 | Urkowitz | 342/111 |
| 5,229,775 | 7/1993 | Sakamoto et al. | 342/196 X |
| 5,245,347 | 9/1993 | Bonta et al. | 342/196 X |

Primary Examiner—T. H. Tubbesing
Attorney, Agent, or Firm—W. H. Meise; C. A. Nieves; S. A. Young

[57] ABSTRACT

A radar system includes a doppler/pulse compressor/- range sidelobe suppressor filter bank (40), which separates received echo signals according to their frequency spectrum into doppler channels, and within each doppler channel performs pulse compression for reducing the duration of the received signals, and also performs range sidelobe suppression, for improving range resolution. It may be advantageous to perform certain types of processing in the time domain, such as determination of spectral moments for estimating velocity spread, mean closing velocity, and reflectivity of a diffuse target such as a weather phenomenon. An inverse (frequency-to-time) transform (50) is performed on the signals produced by the doppler/pulse compressor/range sidelobe suppressor filter bank (40), to produce a reconstructed version of the received signals. In these reconstructed signals, the pulses are compressed, and range sidelobes are reduced. The time-domain processing (62) is performed on the reconstructed signals. In a particular embodiment of the invention, the range sidelobe suppression and pulse compression filters (34a, 34b ...) follow the doppler filters (32), but any ordering of the filters may be used. Interchannel frequency interference attributable to the non-zero bandwidth of the Doppler filters may be reduced by pulse-to-pulse time weighting (30) applied to the received signals over a time window corresponding to a particular dwell, together with inverse weighting (62) following the inverse transformation.

11 Claims, 3 Drawing Sheets

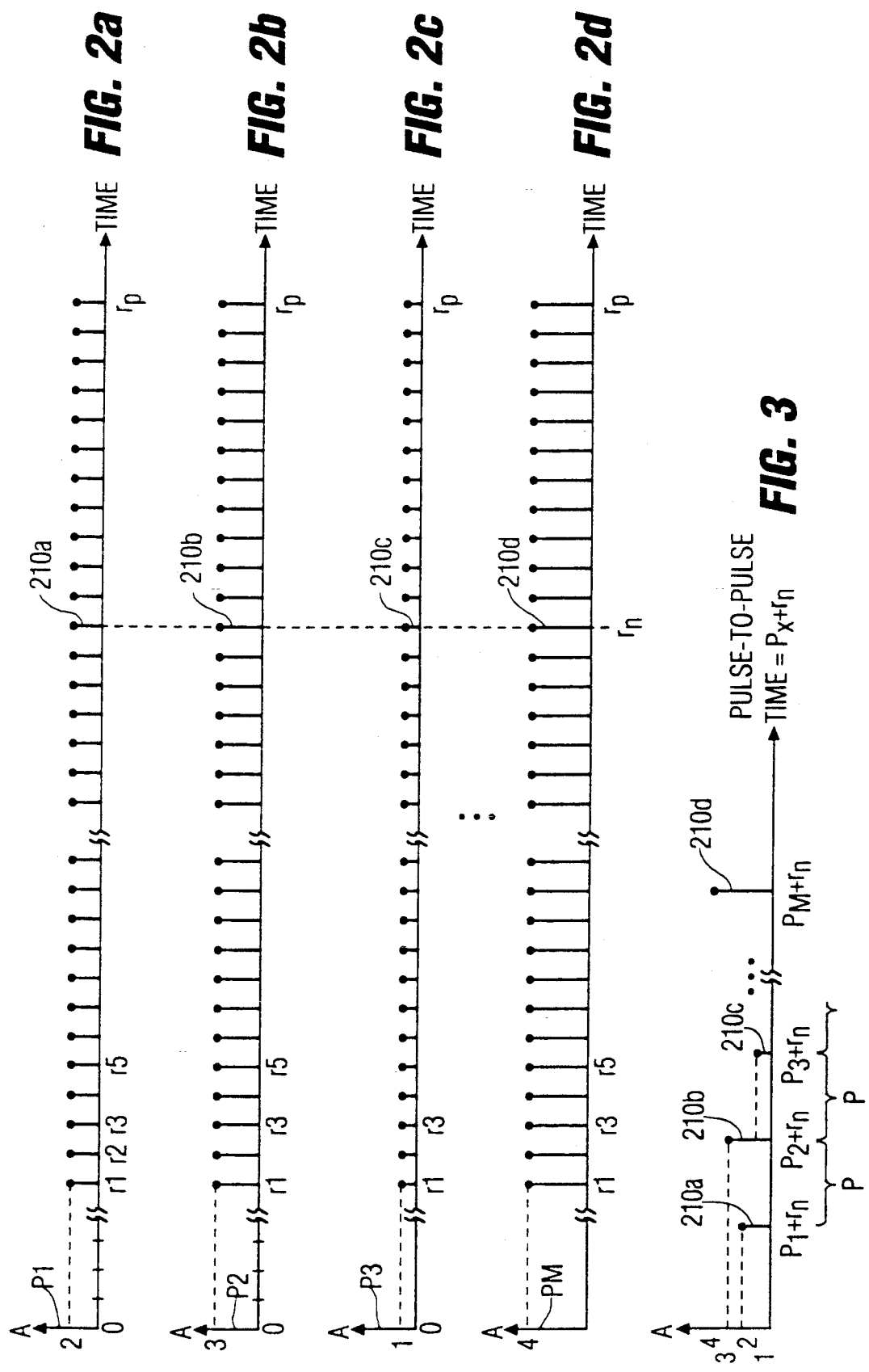

RADAR WITH DOPPLER TOLERANT RANGE SIDELOBE SUPPRESSION AND TIME DOMAIN SIGNAL PROCESSING

This invention relates to radar systems, and more particularly to radar systems with range sidelobe suppression, in which time domain determination of target parameters, such as spectral moments, may be performed.

A radar signal processing scheme for doppler tolerant range sidelobe reduction is described in allowed U.S. Pat. No. 5,173,706, issued Dec. 22, 1992, in the name of Urkowitz, incorporated herein by reference. The processing scheme is described in the context of an air traffic control radar system. It is tolerant to doppler frequency shifts in the sense that an unknown doppler frequency shift, attributable to target motion, causes little deterioration of the range sidelobes of the compressed pulses. As described therein, range sidelobe suppression is accomplished within each doppler filter channel. Another radar system is described in U.S. Pat. No. 5,151,702, issued Sep. 29, 1992 in the name of Urkowitz, also incorporated herein by reference. As described therein, complementary-sequence pulse sets are transmitted, and the returned echoes are processed by code-matched filtering within each doppler channel. These schemes provide the frequency components or a spectral analysis of the pulse-to-pulse fluctuation of the radar echo from each resolvable radar volume.

In radar meteorology, it is of interest to estimate the spectral moments from the sequence of complex envelopes of the echo signal. These spectral moments are used to estimate radar reflectivity, mean closing velocity, and velocity spread of a diffuse or distributed signal such as a weather phenomenon. A number of different processing schemes may be used, which perform time domain processing upon the sequence of complex echo envelopes for determining the pulse-to-pulse autocorrelation function, or parameters of the autocorrelation function.

SUMMARY OF THE INVENTION

A ranging system such as a radar or sonar system transmits dispersed signal pulses having a known duration toward a target. A receiver receives echo signals from the target and forms received pulse signals. The received pulse signals are applied to a bank of filters including a plurality of filter channels. Each filter channel includes a pulse-to-pulse doppler filter, a pulse compressor and a range sidelobe suppressor. Each doppler filter channel is centered at a different frequency. Each channel of the bank of filters is connected to the receiver. The filter bank forms a plurality of doppler filtered received signals in which the effective duration of the pulses is shortened relative to the predetermined duration, and in which range sidelobes are suppressed. Further processing may be performed in known manner to display target parameters. According to an aspect of the invention, an inverse pulse-to-pulse doppler filter bank includes a plurality of input ports coupled to the output ports of the filter bank to regenerate the received pulse signals in the form of compressed pulse echo signals in which the duration of the pulses is essentially that of the compressed pulses, but in which range sidelobes are suppressed. According to a further aspect of the invention, a pulse-to-pulse time weighting arrangement provides a non-uniform amplitude weighting of the pulse echoes within a window to place the received pulse signals in a form which reduces unwanted frequency responses in the pulse-to-pulse doppler filter bank. An inverse time weighting arrangement is coupled to the inverse doppler filter bank for producing a second non-uniform amplitude weighting of the compressed pulse echoes, in which the second non-uniform amplitude weighting is the reciprocal of the first weighting.

DESCRIPTION OF THE DRAWINGS

FIG. 1a is a simplified block diagram of a radar system in accordance with the invention, and FIG. 1b represents an alternative configuration of a portion of FIG. 1a;

FIGS. 2a-2d represent amplitude-versus-time plots of the sequence of range traces following each pulse transmission of the radar system of FIG. 2a;

FIG. 3 is a amplitude-versus-time representation the pulse-to-pulse amplitude versus time for one range value of FIGS. 2a-2d;

DESCRIPTION OF THE INVENTION

Figures 1A, 1B:
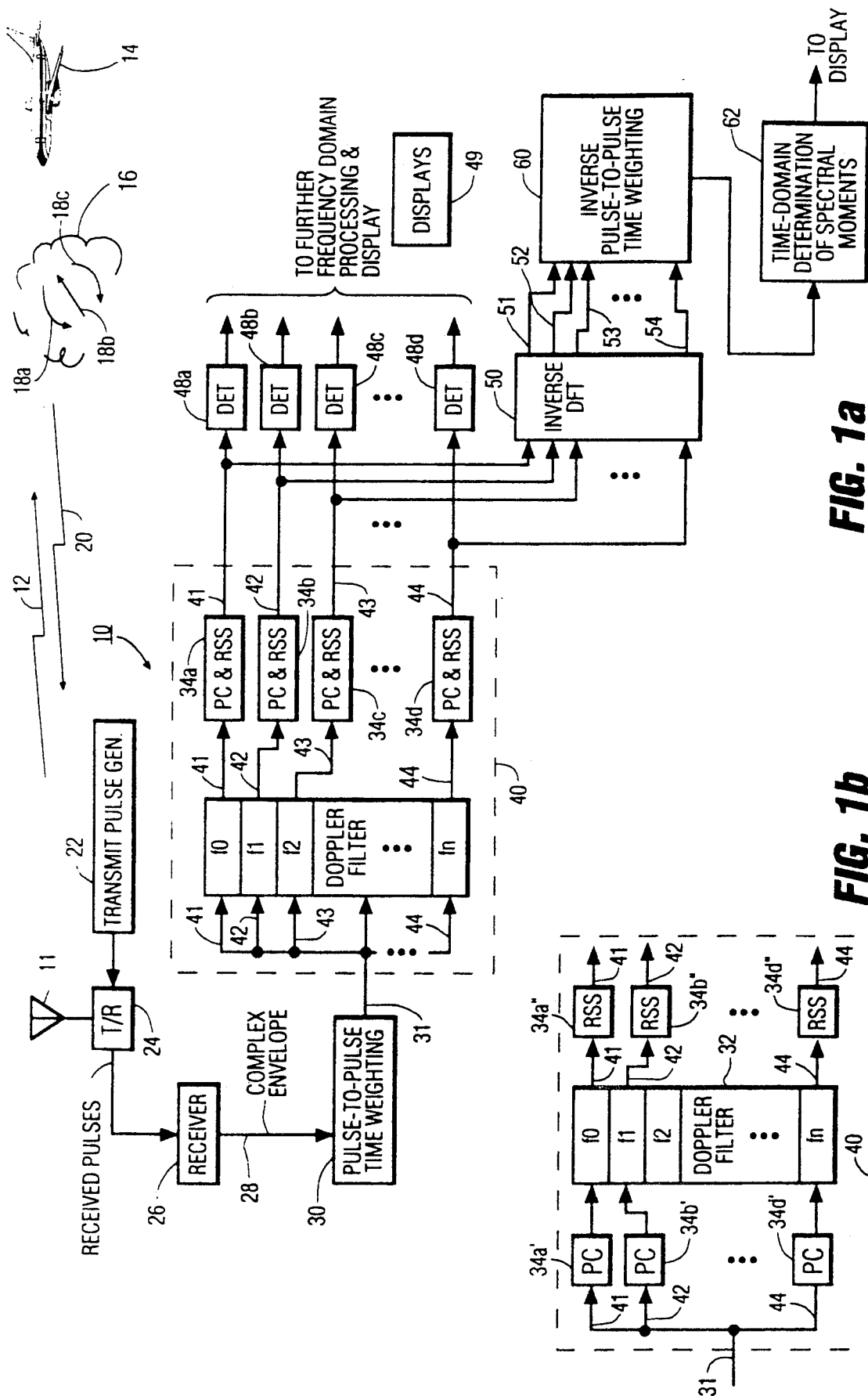

In FIG. 1a, a radar system, designated generally as 10, periodically transmits signals, represented by arrow 12, from an antenna (or other transducer) toward a plurality of targets, which may include a vehicle, represented as an aircraft 14, and medium phenomena illustrated as weather phenomenon 16, in which various disturbances and instantaneous wind velocities in different directions are by arrows 18a, 18b, and 18c. The various targets reflect portions of the transmitted signal 12 to produce return pulse echoes represented by an arrow 20, which return to antenna 11.

Radar system 10 includes a transmit pulse generator 22 coupled by an transmit-receive (T/R) apparatus 24 to antenna for producing transmitted signals 12. Echo signals produced by the targets, and represented by arrow 20, are received by antenna 11, and are coupled by T/R 24 to a receiver 26, which may include analog circuits such as low noise amplifiers, frequency converters and the like. Receiver 26 may also include a digitizing arrangement including a sampler for sampling the echo signal at clock intervals, a quantizer, and a digitizer, which coact for converting each sample into its digital equivalent.

FIG. 2a represents an amplitude (A)-versus-time plot in which time zero (0) represents the time at which a transmitted pulse P1 begins. Return or echo signals cannot be received until a later time $r_1$, which follows completion of the pulse transmission. Time $r_1$ represents the time of the first sampling clock pulse following completion of the transmission of the transmitter pulse, time $r_2$ the time of the second sampling clock pulse, etc. The last sample, $r_p$, occurs at a time representing the maximum range at which targets are expected to be detected. At each clock time, the returned signal is sampled, quantized and digitized to form a set of digital signals representing the amplitude of the received signal, and if desired its phase relative to some reference phase. Since the received pulse echo signals are sampled at a clock rate, the minimum range increment which the radar can resolve is established by the signal velocity in the medium, which for air is designated C. Smaller range increments may be discerned by increasing the sample clock frequency. As illustrated in FIG. 2a, all the samples are shown as having an amplitude of two units. In actuality, the amplitude is expected to vary from zero amplitude to some maximum value from one clock pulse to the next, depending upon the existence or nonexistence of a target at a particular range, and upon its size, motion and reflection characteristics. FIG. 2b represents a time line similar to that of FIG. 2a, but for the next following transmitted pulse P2. The clock intervals are the same as in FIG. 2a, but the amplitudes are all shown as having a 3-unit amplitude. Similarly, FIG. 2c shows a time line associated with the transmission of a third pulse, P3, and reception of 1-unit amplitude signals in the following interval. A later transmitted pulse $P_M$ is illustrated in FIG. 2d, The collection of pulses $P_1$, $P_2$, $P_3$ . . . $P_M$ represented in FIGS. 2a-2d represent all the pulses transmitted from antenna during a particular dwell, which is the time during which the antenna is "pointed" in a particular direction. Other pulses may be transmitted and other echoes may be received during other dwells.

The time information derived from the amplitude-time plots of FIGS. 2a-2d may be used to detect targets and establish their ranges. However, it is often desired to examine the characteristics of a target at a particular range. Such a condition may occur when a slowly moving target includes substantial detail; in particular, characteristics of its echo. For example, an aircraft moving along a tangent to a radius from the antenna has a small or zero radial velocity, so its range remains essentially constant, yet the echo may provide substantial information indicating whether it is propeller-driven, and if so how many engines it has, and the like. Also, slowly moving weather phenomena may simultaneously contain wind gusts in various different directions. The characteristics of the signal may be examined on a pulse-to-pulse basis, by which the sample at a particular time after the transmitted pulse, as for example at time $r_n$ in FIGS. 2a-2d, are compared with each other. Such pulse-to-pulse samples represent echoes from targets at the same range. FIG. 3 represents the result of pulse-to-pulse sampling at time $r_n$ of the signals represented by FIGS. 2a-2d. In FIG. 3, pulses 210a, 210b, and 210c are separated by an interpulse time period P, which is the duration between time zero and time $r_p$ of any of FIGS. 2a-2d. The fluctuations in the amplitude of the echo signal from transmitted pulse to transmitted pulse are clearly visible in FIG. 3. These fluctuations represent changes in the echo signal at a particular range, from which additional information may be derived.

Figure 4A:
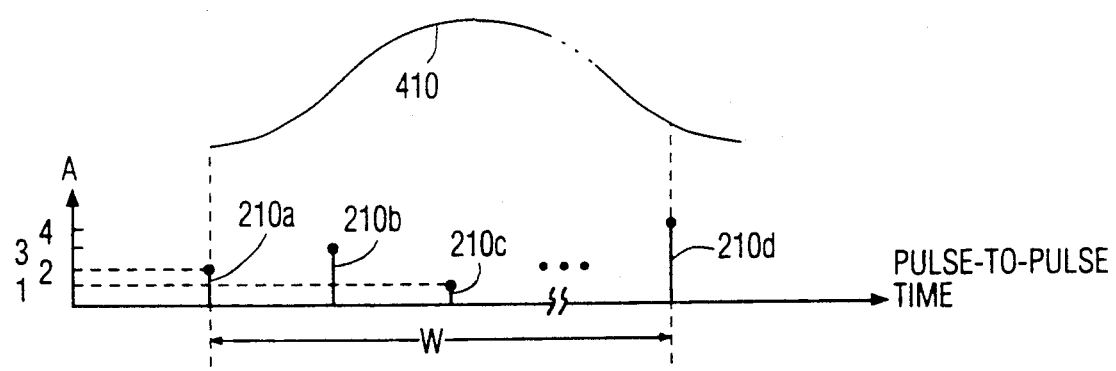
FIG. 4a represents an amplitude-versus-time weighting function overlaid over pulse-to-doppler pulse sample values.
Figure 4B:
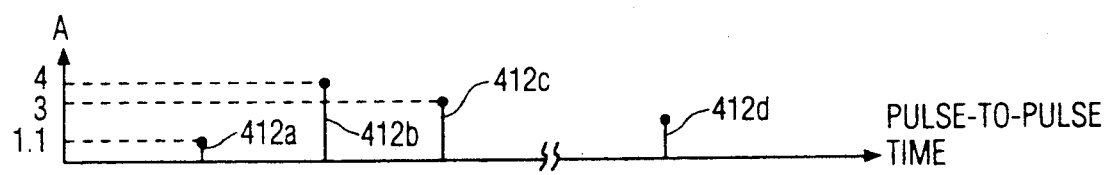
FIG. 4b represents the product of the samples of FIG. 4a multiplied by the time weighting function.

The received signals representing the complex envelope are applied from receiver 26 in FIG. 1a over a data path 28 to a pulse-to-pulse time weighting arrangement 30, and then to a doppler filter bank 32, which may perform a discrete Fourier transformation (DFT) or an approximation thereto. Time weighting arrangement 30 multiplies the pulse-to-pulse received signals samples from each range. Since there are a number of pulse-to-pulse samples at each antenna dwell, these pulse-to-pulse samples may be considered as occurring during a fixed time window. Within this window, the pulse-to-pulse samples at each range (or at least at each range of interest) are weighted by multiplication by a time weighting function. Within the window, the sample values at the ends of the window are reduced in amplitude relative to those samples near the center, in order to reduce frequency interference between adjacent frequency channels of doppler filter bank 32 attributable to the non-zero bandwidth of the filters. FIG. 4a represents the pulse-to-pulse return pulse or echo signal of FIG. 3, upon which is superposed an amplitude weighting function 410, which varies in amplitude in a nonlinear manner as a function of pulse-to-pulse time within a time window designed W. As illustrated, amplitude weighting function 410 has a relatively low value at the two ends of window W, and a maximum value near the center. When weighting function 410 is multiplied by the corresponding sample values 210a, 210b, 210c . . . 210d as represented in FIG. 4b, the amplitudes of the sample values near the ends of the window are reduced relative to the values near the center of the window. The amplitude function is selected, as described above, to reduce frequency "sidelobes" or unwanted frequency responses in the doppler filters described below.

The weighted signals produced by time weighting block 30 of FIG. 1a are applied by way of a path 31 to a doppler/pulse compression/range sidelobe suppression filter bank designated 40 in FIG. 1a. Within filter 40, the digitized signal on path 31 is applied in parallel to a plurality of channels 41, 42, 43 . . . 44. Each channel 41, 42, 43 . . . 44 includes a doppler filter $f_0$, $f_1$, $f_2$ . . . $f_n$ of a doppler filter bank 32, a pulse compression (PC) filter and a range sidelobe suppressor (RSS) illustrated in pairs as PC & RSS blocks 34a, 34b, 34c . . . 34d. Doppler filter bank 32 channelizes the digitized received signals by separating the signals according to frequency into predetermined "bins", designated $f_0$, $f_1$, $f_2$ . . . $f_n$. Within channelizing filter bank 40, the signals are separated or sorted by frequency. Thus, the channel designated 41 carries signals within a certain frequency band or range, the channel designated 42 carries signals within another frequency band, channel 43 carries signals within a third frequency band, and channel 44 represents a channel carrying the last frequency range of the set handled by doppler filter bank 32. Within each channel 41, 42, 43 . . . 44, pulse compression and range sidelobe suppression are accomplished. As illustrated in FIG. 1a, the pulse compression and range sidelobe suppression (PC&RSS) functions are performed on the output side of doppler filter bank 32. More particularly, a pulse compressor and range sidelobe suppressor (PC&RSS) 34a is coupled in channel 41 following filter $f_0$ of doppler filter bank 32, PC&RSS 34b is coupled in channel 42 following filter $f_1$ of doppler filter bank 32, PC&RSS 34c is coupled in channel 43 following filter $f_2$ of doppler filter bank 32, and PC&RSS 34d is coupled in channel 44 following filter $f_N$ of doppler filter bank 32. As described in the aforementioned Urkowitz patent application, the signals in the various doppler channels may be converted to a common frequency range, so that all the PC&RSS units are identical.

The pulse compression and range sidelobe suppression functions may be performed anywhere within the corresponding channel, either before or after the doppler filter bank. FIG. 1b illustrates channelized filter bank portion 40 of FIG. 1a. with the pulse compression (PC) portion of the processing preceding the filter bank, and the range sidelobe suppression (RSS) portion of the processing following the filter bank. In FIG. 1b, a PC 34a' is coupled in channel 41 preceding filter $f_0$ of doppler filter bank 32, and an RSS 34a'' is coupled in channel 41 following $f_0$. PC 34b' is coupled in channel 42 preceding filter $f_1$ of doppler filter bank 32, and RSS 34b'' is coupled in channel 42 following filter $f_1$. Similarly, PC 34d' is coupled in channel 44 preceding filter $f_N$ of doppler filter bank 32, and RSS 34d'' is coupled in channel 44 following filter $f_N$. Instead of having the pulse compressors preceding the doppler filter and the range sidelobe suppression following, the range sidelobe suppression could precede the doppler filter and the pulse compressor could follow it, or as a yet further alternative, both the pulse compressor and the range sidelobe suppressor could precede the doppler filter in each channel.

The doppler filtered received signals in each channel 41, 42, 43 and 44 of filter bank 40 of FIG. 1a, and in other channels not separately designated, separated according to frequency spectrum, pulse compressed and range sidelobe suppressed by appropriate processing, are applied to a plurality of detectors 48a, 48b, 48c ... 48d, in which the envelopes are detected to produce detected signals, which are coupled for further conventional frequency domain (not illustrated), to produce displays 49 of target range, velocity, and the like, all in known manner.

A number of signal processing arrangements exist for performing various analyses of the returned pulses. Such programs include, for example, determination of spectral moments, as described in *Doppler Radar and Weather Observations,* Richard J. Doviak and Dusan S. Zrnic, Academic Press 1984, ISBN 0-12-221420-X, §6.4.1, page 103 et seq; §6.5.1, page 108 et seq, for estimating mean closing velocity, velocity spread and radar reflectivity of a diffuse target. It is advantageous to be able to use existing or known methods for producing such determinations. However, the pulse-to-pulse signals generated within channelized portion 40 of radar system 10 of FIG. 1a may not be compatible with such processing. An inverse pulse-to-pulse DFT, which is a frequency-to-time transformation arrangement, illustrated as inverse DFT block 50, includes a plurality of input ports, each one of which is coupled to a different one of channels 41, 42, 43 ... 44 associated with channelized portion 40 of the radar system. Inverse DFT pulse-to-pulse transforming block 50 processes the pulse-to-pulse signals to reconstitute the original received time-domain signal pulses, which reconstituted pulses are both pulse compressed and range sidelobe suppressed. Thus, the reconstituted pulses in the time domain are substantially improved over the pulses as received at receiver 26. Inverse DFT functions are well known in the radar arts. In conventional radar systems, convolution processing of range samples, which was previously performed by transverse filters, has more recently, with the advent of numerical processors, been accomplished by a four-step process of (a) grouping the range samples into sets for batch processing, (b) performing a DFT such as the fast Fourier transform (FFT) to transform each batch of range samples to the frequency domain, (c) multiplying the frequency domain values by stored coefficients, and (d) performing an inverse DFT such as an inverse FFT to return to the time domain. The inverse DFT performed by block 50 differs from the DFT conventionally used in such radar applications, in that it operates on a pulse-to-pulse basis on pulse compressed, range sidelobe suppressed samples. The clocking arrangements necessary to operate a DFT at pulse-to-pulse frequencies are well within abilities of those skilled in the art. Inverse DFT block 50 produces, on a first output path 51, a time-domain range trace or sequence of range samples corresponding to echo samples 210a of FIG. 2a, originating from transmitted pulse $P_1$. The signals produced on output path 52 correspond to echo samples 210b of FIG. 2b, which are produced by the second pulse, $P_2$, of the batch of pulses at the dwell of interest. Similarly, the signals produced by inverse DFT block 50 on output paths 53 ... 54 correspond to the echo signals 210c ... 210d produced by transmitted pulses $P_3$ ... $P_M$, respectively.

Figure 5A:
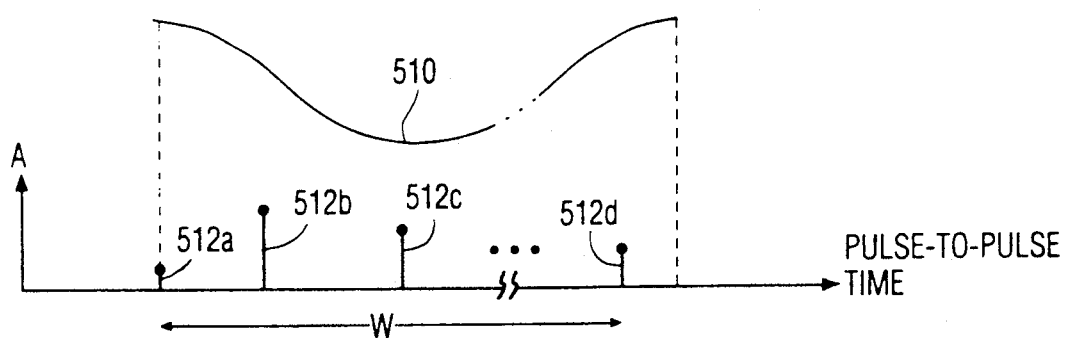
FIG. 5a represents the inverse time weighting function overlaid on pulse-to-pulse samples values.
Figure 5B:
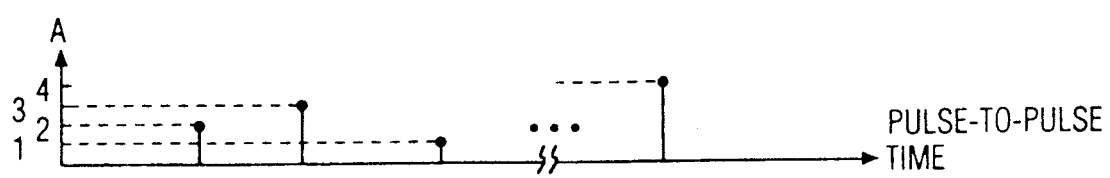
FIG. 5b represents the product of the samples of FIG. 5a multiplied by the inverse time weight function.

The time-domain range trace information produced at the output of inverse DFT block 50 of FIG. 1a is applied to an inverse pulse-to-pulse weighting block 60. Inverse weighting block 60 impresses a weighting function, illustrated as 510 in FIG. 5a, on the batch of pulse-to-pulse samples within window W at each range of interest. The pulse-to-pulse samples 512a, 512b, 512c ... 512d. Within window W are illustrated in FIG. 5a as having the same amplitude of 1.1, 4, 3 and 2, respectively, as weighted samples 412a, 412b, 412c and 412d, respectively, of FIG. 4b. This selection is for convenience, and such an amplitude correspondence is unlikely in an actual system. Weighting function 510 of FIG. 5a is illustrated as a continuous function for ease of understanding, but it is likely to actually be in the form of discrete values stored in memory. The inverse weighting function, represented by the "shape" of curve 510, is inverse to weighting function 410 of FIG. 4a, at least insofar as it tends to reduce the amplitude of samples near the center of window W relative to those samples near the ends of the window. Samples 514a, 514b, 514c ... 514d of FIG. 5b represents samples 512a, 512b, 512c ... 512d of FIG. 5a after multiplication by weighting function 510, with amplitudes selected to represent relative change. Sample values 514a, 514b, 514c ... 514d are "un-weighted" or "de-weighted" time-domain range sample values corresponding to the received pulses, with pulse time compression and range sidelobe suppression as described above, and with reduced frequency interference due to the use of the weighting/inverse weighting pair.

A time-domain determination of spectral moment apparatus, illustrated in FIG. 1a as a block 62, is coupled to inverse pulse-to-pulse time weighting block 60, for receiving the unweighted or de-weighted reconstituted time-domain pulses, and for generating spectral moments therefrom as described in the aforementioned Doviak et al. text. Since the pulses produced at the output of inverse processor 50 are pulse compressed in a manner which is doppler tolerant and range sidelobe suppressed, the resulting determination of spectral moments is more accurate than if the pulses were not so processed.

Other embodiments of the invention will be apparent to those skilled in the art. For example, the described processes may be performed by either analog or digital processing, as appropriate, or by a combination thereof. Digital signals may be in either serial or parallel format. While the time weighting provided by block 30 together with its inverse weighting provided by block 60 may provide improved performance, it is not absolutely necessary and may be dispensed with. While the distinct dwells are preferably provided by an electronically scanned array antenna, a plurality of discrete separate antennas could be used, with switching provided among the antennas. Instead of time determination of spectral moments, one or more of any type of time-domain processing could follow inverse DFT block 50.

What is claimed is:

1. A ranging system for transmitting dispersed signals through a medium toward a target, and for receiving echoes of said signals, comprising:

transmitting means for transmitting dispersed signal pulses, having a predetermined duration, toward said target;

receiving means for receiving echo signals from said target for forming received pulse signals;

a bank of a first plurality of pulse-to-pulse doppler filter channels;

a plurality, equal to said first plurality, of pulse compression means;

a plurality, equal to said first plurality, of range sidelobe suppression means;

coupling means coupled to said receiving means, said bank of pulse-to-pulse doppler filter channels, said pulse compression means, and said range sidelobe suppression means, for coupling each of said pulse compression means in cascade with one of said range sidelobe suppression means and with one of said doppler filter channels, to form a plurality, equal to said first plurality, of cascaded filters, and for connecting each of said cascaded filters to said receiving means, for filtering said received signals to form a plurality, equal to said first plurality, of doppler filtered, frequency domain received signals in which range sidelobes are suppressed and in which the effective duration of said pulses is shortened from said predetermined duration;

pulse-to-pulse frequency-to-time signal transformation means coupled to each of said cascaded filters, for converting said frequency domain received signals into regenerated time-domain received signals in which said range sidelobes are suppressed and in which the effective duration of said pulse is shortened from said predetermined duration.

2. A system according to claim 1, further comprising:
   time-domain signal estimation means coupled to said signal transformation means for generating estimated signal parameter information; and
   display means coupled to said signal estimation means for displaying said information.

3. A system according to claim 2, wherein said signal estimation means comprises spectral moment estimation means.

4. A system according to claim 1, further comprising:
   pulse-to-pulse time weighting means coupled to said receiving means, for producing a first nonuniform amplitude weighting of said pulse echoes in a predetermined time window, for weighting said received pulse signals to form weighted received pulse signals which reduce unwanted frequency responses in said bank of pulse-to-pulse doppler filter channels.

5. A system according to claim 4, further comprising:
   pulse-to-pulse inverse time weighting means coupled to said frequency-to-time signal transformation means for producing a second nonuniform amplitude weighting of said regenerated time domain received signals, which second nonuniform amplitude weighting is the reciprocal of said first nonuniform amplitude weighting.

6. A method for determining the range of a target, comprising the steps of:

generating dispersed signal pulses having a predetermined duration;

transmitting said dispersed signal pulses toward said target for generating echo signals;

receiving said echo signals from said target for forming received pulse signals;

applying said received pulse signals to a plurality of pulse-to-pulse filter channels;

pulse-to-pulse doppler filtering said received pulse signals within said plurality of pulse-to-pulse filter channels;

time-compressing said received filter channels within said pulse-to-pulse filter channels;

suppressing range sidelobes of said received pulse signals within said pulse-to-pulse filter channels, whereby a plurality of doppler-filtered received pulse signals are generated, in which said pulses have a duration less than said predetermined duration, and in which range sidelobes are suppressed;

applying said plurality of doppler-filtered received pulse signals from said plurality of channels to a corresponding input port of a pulse-to-pulse frequency-to-time transformation filter, and within said pulse-to-pulse frequency-to-time transformation filter, processing said doppler-filtered received pulse signals together to regenerate said received pulse signals in the form of compressed pulse echoes, having a duration less than said predetermined duration, and in which range sidelobes are suppressed.

7. A method according to claim 6, wherein said target is distributed, and further comprising the step of:
   operating on said compressed pulse echoes with a signal processor performing a time-domain-based determination of spectral moments.

8. A method according to claim 6, further comprising the steps of:
   further processing each of said plurality of doppler-filtered received pulse signals by steps including envelope detection, to form a plurality of detected processed signals; and
   displaying target parameters including target range in response to said detected processed signals.

9. A method according to claim 8, wherein said target is distributed, and further comprising the step of:
   operating on said compressed pulse echoes with a signal processor performing a time-domain-based determination of spectral moments.

10. A method according to claim 9, further comprising the steps of:
    grouping sets of said received pulse signals into pulse-to-pulse batches, each batch occurring within a time window;
    multiplying said batches of received pulse signals, in said time window, by a predetermined pulse-to-pulse non-uniform amplitude weighting function, selected for reducing unwanted frequency responses during said step of pulse-to-pulse doppler filtering; and
    multiplying said compressed pulse echoes, in said window, by an inverse pulse-to-pulse non-uniform amplitude weighting function which is the reciprocal of said predetermined pulse-to-pulse non-uniform amplitude weighting function used in said step of multiplying said received pulse signals.

11. A method according to claim 6, further comprising the steps of:

grouping sets of said received pulse signals into pulse-to-pulse batches, each batch occurring within a time window;

multiplying said batches of received pulse signals, in said time window, by a predetermined pulse-to-pulse non-uniform amplitude weighting function selected, for reducing unwanted frequency responses during said step of pulse-to-pulse doppler filtering; and multiplying said compressed pulse echoes, in said window, by an inverse pulse-to-pulse non-uniform amplitude weighting function which is the reciprocal of said predetermined pulse-to-pulse non-uniform amplitude weighting function used in said step of multiplying said received pulse signals.

* * * * *